3,368,901
SILAGE AND METHOD OF PREPARING SAME
John E. Thompson, 908 Burns Ave.,
Flossmoor, Ill. 60422
No Drawing. Continuation-in-part of application Ser. No. 392,914, Aug. 28, 1964. This application May 5, 1967, Ser. No. 636,257
4 Claims. (Cl. 99—8)

ABSTRACT OF THE DISCLOSURE

Green ensilage is preserved by adding 0.1–2% sodium hexametaphosphate or sodium tripolyphosphate as a gelling agent prior to fermenting to reduce the amount of drainage and loss of nutrients.

---

This application is a continuation-in-part of my prior copending application, Ser. No. 392,914, filed August 28, 1964, now abandoned.

Heretofore methods of preserving ensilage have been of two general types. In the first type, the ensilage is stored in a silo and allowed to ferment. This causes the loss of a large amount of liquid material which carries with it the digestible nutrients including a substantial portion of the protein, both representing a loss of food value in the resulting ensilage.

The European method, sometimes designated as the A.I.V. method requires the addition of some acid to the fodder to bring the pH within the range of 3 to 4. Hydrochloric, sulphuric, phosphoric and several other acids can be used. This method, while it has produced an acceptable cattle feed, loses through drainage a large quantity of the carbohydrates and proteins.

Patent 2,213,127 to Kerschbaum et al. discloses and claims an acid process for preserving ensilage having a pH of less than 4. Patent 2,733,146 to Holst discloses and claims a method of using sodium acid phosphate for preserving ensilage wherein the pH is maintained within the range of 4 to 4.5.

It is an object of the present invention to provide a process for the production of ensilage in which the carbohydrates and proteins are retained.

It is also an object of the present invention to produce an ensilage wherein the proteins and carbohydrates form a gel.

It is a still further object of the present invention to control the pH so that it approaches a neutral value.

These and other objects will be apparent from the following description and examples which are used for the purpose of illustration only and are not a limitation on the invention.

In the operation of this process fresh cut corn, to which has been added a quantity of sodium hexametaphosphate or sodium tripolyphosphate or a mixture of both, is blown into a silo. The addition of these substances in an amount of approximately 1% or 20 lbs. per ton of chopped corn prevents excessive drainage from the silo and retains therein the nutrients in the form of a gel. The corn is usually harvested about the time that the grains of the corn start to form a depression on the top of the kernel. The ensilage includes the stalk of the corn, the fodder and the entire ear of corn. This is usually chopped and blown into the top of the silo. At the time the ensilage is blown in the sodium salts of hexametaphosphate or sodium tripolyphosphate are added. The material is allowed to settle for one or two days and then the vacant space at the top of the silo is refilled with green chopped ensilage containing the additive.

After a period of approximately one year comparative silos of untreated and treated material gave the following results:

TABLE 1

| Test 100 Ton Silo | Untreated | | | Treated | | |
|---|---|---|---|---|---|---|
| | Wet Basis, Percent | Dry Basis, Percent | Lb./Ton Green Corn | Wet Basis, Percent | Dry Basis, Percent | Lb./Ton Green Corn |
| Protein | 3.24 | 13.50 | 49.05 | 3.52 | 11.56 | 60.33 |
| Fat | .89 | 3.72 | 13.47 | 1.13 | 3.72 | 19.37 |
| Fiber | 3.20 | 13.35 | 48.45 | 4.07 | 13.35 | 69.76 |
| NFE* | 15.01 | 62.55 | 227.25 | 18.90 | 62.02 | 323.95 |
| Mineral | 1.65 | 6.88 | 24.98 | 2.85 | 9.35 | 48.85 |
| Total Dry | 24.00 | 100.00 | 363.20 | 30.48 | 100.00 | 522.26 |
| Total Moist | 76.00 | | 1,150.65 | 69.52 | | 1,191.57 |
| All | 100.00 | | 1,513.84 =75.7% | 100.00 | | 1,713.83 =85.7% |

*When a feed is analyzed for water, protein, fat, fibre and mineral the total of these is subtracted from 100 to give a percentage known as "NFE".

Treatment consists of addition of 20 lbs. (1%) sodium tripolyphosphates ($Na_5P_3O_{10}$) per ton of green chopped corn at the time of harvest before putting in to the silo.

TABLE 2

| Test 100 Ton Silo | Untreated | | | Treated | | |
|---|---|---|---|---|---|---|
| | Wet Basis, Percent | Dry Basis, Percent | Lb./Ton Green Corn | Wet Basis, Percent | Dry Basis, Percent | Lb./Ton Green Corn |
| Protein | 3.06 | 12.94 | 46.33 | 3.28 | 11.63 | 56.22 |
| Fat | 0.88 | 3.72 | 13.32 | 1.05 | 3.72 | 18.00 |
| Fiber | 3.16 | 13.35 | 47.84 | 3.76 | 13.35 | 64.45 |
| N.F.E. Carbohydrate | 14.67 | 61.98 | 222.10 | 16.91 | 60.05 | 289.84 |
| Mineral | 1.90 | 8.01 | 28.77 | 3.17 | 11.25 | 54.33 |
| Total Dry | 23.67 | 100.00 | 358.36 | 28.16 | 100.00 | 482.84 |
| Total Moist | 76.33 | | 1,155.64 | 71.84 | | 1,231.34 |
| All | 100.00 | | 1,514.00 =75.7% | 100.00 | | 1,714.18 =85.7% |

Treatment consists of addition of 20 lbs. (1%) per ton of green chopped corn of sodium hexameatphosphate $Na_6(PO_3)_6$.

Treatment consists of addition of 20 lbs. (1%) per ton of green chopped corn of sodium hexametaphosphate $Na_6(PO_3)_6$.

While in the above examples sodium tripolyphosphate and sodium hexametaphosphate have been used, a mixture of these two materials has proven satisfactory.

The use of sodium salts of tripolyphosphates and hexametaphosphates apparently form a gel and retain the proteins and carbohydrates within the silo and prevent the usual drainage which accompanies fermentation within the silo. This retains the food value of the ensilage and does not allow the run-off of nutrients released by the decomposition of the green fodder. The ensilage when it is removed from the silo is an olive green color and does not have the offensive odor of the acid treated ensilage and is very acceptable as a cattle feed.

The foregoing examples show the addition of 1% by weight of sodium tripolyphosphate or sodium hexametaphosphate, since an addition of about 1% produces the most economically satisfactory result in the case of most silage, but it will be appreciated that the exact percentage to be applied in each case is dependent on at least three factors:

(1) The point of diminishing returns, at which an increase in the proportion of tripolyphosphate and/or hexametaphosphate no longer increases the retention of carbohydrates and proteins to an extent justifying the cost of the increase.

(2) The width of a zone below the point of diminishing returns within which the tripolyphosphate and/or hexametaphosphate are effective in more or less direct proportion to the quantity thereof added per ton of silage.

(3) The moisture content of the silage. In general, the higher the moisture content, the larger the proportion of the specified phosphates required.

By experimenting with these factors, it has been found that in order to produce any noticeable improvement in the properties of even the driest silage it is necessary to add at least 0.1% by weight of the specified phosphates, and that even with relatively moist silage the addition of more than 2% of the specified phosphates produces an improvement in silage quality too small to justify the additional expense, at most prices.

Any addition between 0.1% and 2% is beneficial and economic, with the maximum benefits of the invention obtained at about 1% with silage having a normal water content, at a slightly smaller percentage with very dry silage and a little higher percentage with very moist silage.

It will be appreciated that, as the growing season progresses beyond a certain point, corn becomes progressively drier, and during this period its moisture content will, in a normal season, decrease from above 80% to below 65%. Ideally all the corn to be used for silage would be cut when its moisture content is about 70%, but since it is uneconomic to maintain sufficient equipment and impractical to secure enough temporary help to do this in the relatively few days when the moisture content remains at this figure, it is advantageous to be able to spread the cutting period over as long a time as possible. Since my invention reduces the loss through run-off of nutrients, it becomes possible to use corn having a moisture content substantially in excess of 70% due to being cut earlier in the season, thus extending the cutting period, and thereby reducing the amount of equipment required to harvest a given quantity of corn while leveling off the day to day labor requirements.

The amount of phosphorous that has been added is usually supplemented with additional mineral compounds, but not as much is required as heretofore as the additive phosphates are available and are not lost due to drainage.

Other materials may also be added to the ensilage such as molasses, chopped corn or corn cobs, depending upon the stage of feeding to obtain the proper nutrient balance within the feed to produce cattle of the desired finish.

The use of the additives of this invention not only produce more lbs. of feed per ton of fresh out ensilage, but the feed is of better quality than when no additives are added to the green forage.

The results obtained with sodium hexametaphosphate or sodium tripolyphosphate are not obtained with trisodium phosphates $Na_3PO_4$, or with phosphoric acid, $H_3PO_4$.

While in the above experiments corn was used, other materials, such as sorghum, and grass have proven satisfactory. These materials have not proven satisfactory in those regions where high temperature causes rapid fermentation with a large loss of nutrients, except when additives as disclosed above have been used. This retains the nutrients and prevents excessive loss through seepage. This is particularly true in the semi-tropical conditions that exist in Florida.

What is claimed is:

1. A process for preserving ensilage comprising; adding to the green ensilage approximately 1% by weight of a gelling agent consisting essentially of at least one substance selected from the group consisting of sodium hexametaphosphate and sodium tripolyphosphate, and fermenting the resulting mass.

2. A process for preserving ensilage comprising; adding to the green ensilage from 0.1 to 2% by weight of a gelling agent consisting essentially of at least one substance selected from the group consisting of sodium hexametaphosphate and sodium tripolyphosphate, and fermenting the resulting mass.

3. A cattle feed product comprising ensilage to which has been added prior to fermentation, approximately 1% by weight of a gelling agent consisting essentially of at least one granular substance selected from the group consisting of sodium hexametaphosphate and sodium tripolyphosphate, whereupon the resulting mass was fermented.

4. A cattle feed product comprising ensilage to which has been added prior to fermentation, from 0.1 to 2% by weight of a gelling agent consisting essentially of at least one granular substance selected from the group consisting of sodium hexametaphosphate and sodium tripolyphosphate, whereupon the resulting mass was fermented.

References Cited

UNITED STATES PATENTS

| | | | |
|---|---|---|---|
| 2,213,127 | 8/1940 | Kerschbaum et al. | 99—8 |
| 2,629,664 | 2/1953 | Watts et al. | 99—2 X |
| 2,667,416 | 1/1954 | McFee | 99—7 |
| 3,165,413 | 1/1965 | Weber et al. | 99—6 |
| 3,249,442 | 5/1966 | Keyes et al. | 99—9 X |
| 3,325,289 | 6/1967 | Lyons | 99—2 X |

LIONEL M. SHAPIRO, *Primary Examiner.*